(12) United States Patent
Jan et al.

(10) Patent No.: US 6,220,420 B1
(45) Date of Patent: Apr. 24, 2001

(54) SEMICONDUCTOR COMPOSITION MATERIAL CONVEYER MODULE

(75) Inventors: Chalson Jan, Hsintien; Story Huang, Hsinchu; Shin-Hsiung Lee, Hsintien, all of (TW)

(73) Assignees: Industrial Technology Research Institute, Hsinchu Hsieh; Gallant Precision Machining Co., Ltd., Taipei Hsien, both of (TW)

( * ) Notice: Subject to any disclaimer, the term of this patent is extended or adjusted under 35 U.S.C. 154(b) by 0 days.

(21) Appl. No.: 09/281,438

(22) Filed: Mar. 30, 1999

(51) Int. Cl.⁷ .................... B65G 47/29; B65G 47/54; B65G 47/57
(52) U.S. Cl. ...................... 198/369.1; 198/460.1; 198/463.3; 198/463.4; 198/459.6
(58) Field of Search ................... 198/460.1, 463.3, 198/463.4, 459.6, 459.7, 463.6, 572, 369.1

(56) References Cited

U.S. PATENT DOCUMENTS

| | | | |
|---|---|---|---|
| 2,785,785 | * | 3/1957 | Macaluso ............... 198/463.3 X |
| 2,924,323 | * | 2/1960 | Holben ................. 198/463.4 X |
| 3,493,095 | * | 2/1970 | Messerly ............... 198/463.3 X |
| 3,621,975 | * | 11/1971 | Vilen .................. 198/460.1 |
| 4,088,221 | * | 5/1978 | Bowser ................. 198/463.4 |
| 4,197,935 | * | 4/1980 | Aterianus et al. ....... 198/460.1 |
| 4,240,538 | * | 12/1980 | Hawkes et al. .......... 198/460.1 X |
| 4,676,361 | * | 6/1987 | Heisler ................ 198/463.4 X |

FOREIGN PATENT DOCUMENTS

701896 * 12/1979 (SU) .................. 198/463.3

* cited by examiner

Primary Examiner—Eileen D. Lillis
Assistant Examiner—Thuy V. Tran
(74) Attorney, Agent, or Firm—Bacon & Thomas

(57) ABSTRACT

A semiconductor composition material conveyer module, which includes at least one horizontal conveyer unit and at least one vertical conveyer unit arranged with the at least one horizontal conveyer unit to form an automatic production line for conveying semiconductor composition material for processing. A displacement sensor is triggered when semiconductor composition material is delivered from the horizontal conveyer unit at one production line to the matched vertical conveyer unit, thereby causing the matched vertical conveyer unit to carry semiconductor composition material to a horizontal conveyer unit at a second production line for further processing.

8 Claims, 8 Drawing Sheets

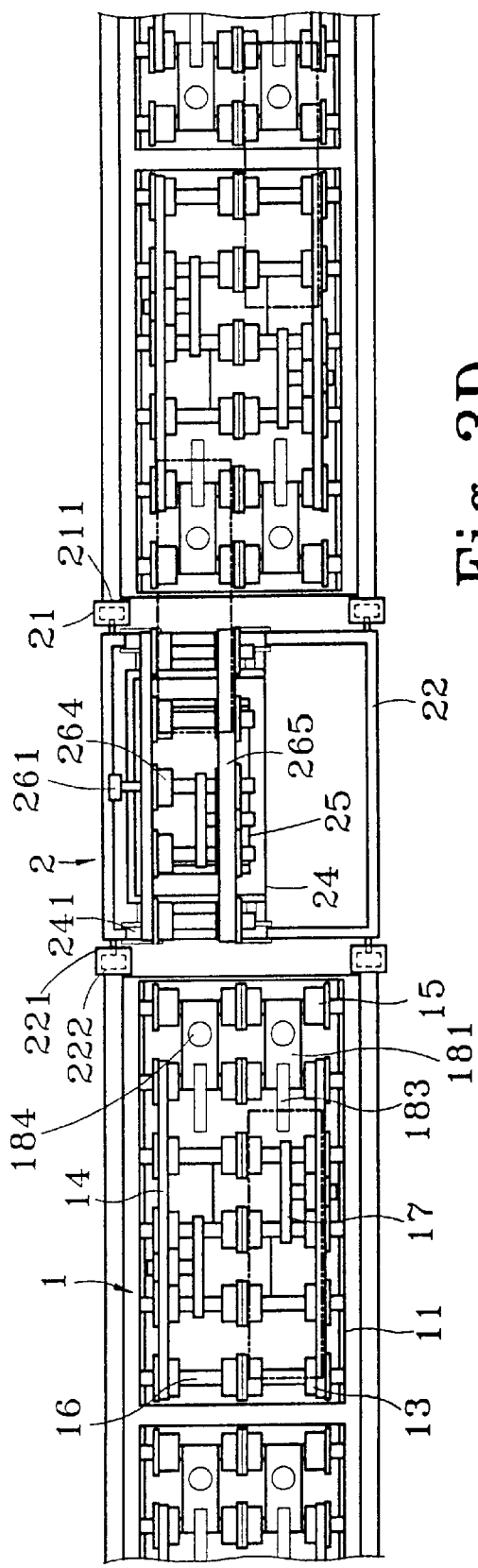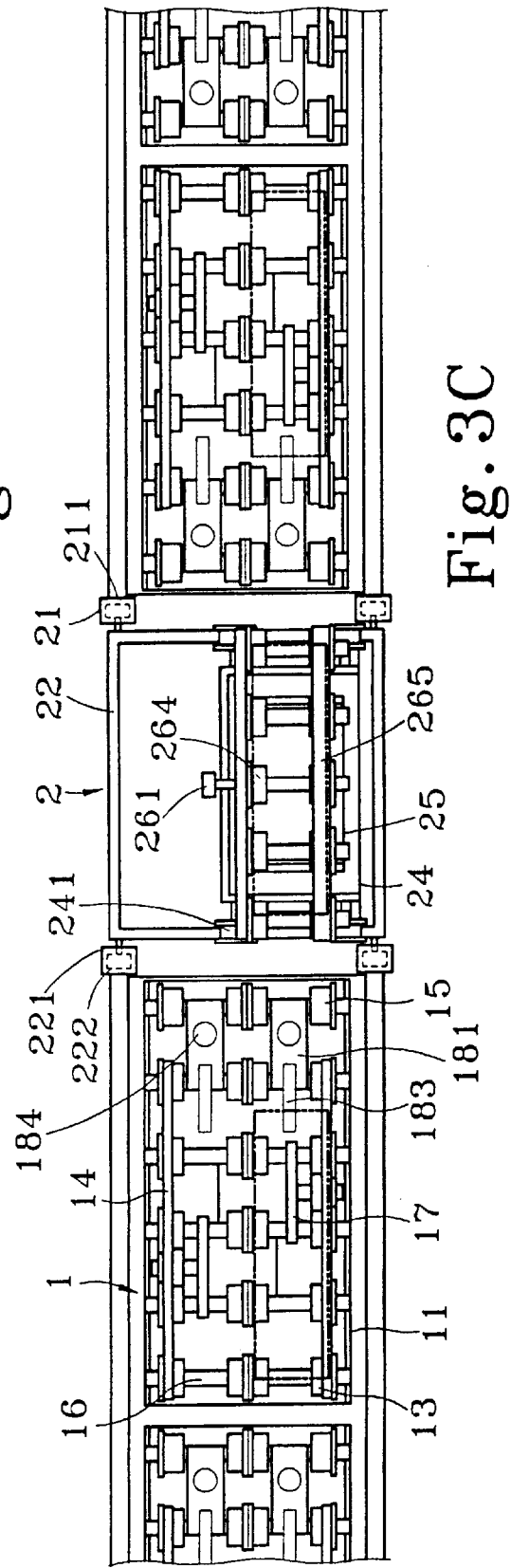

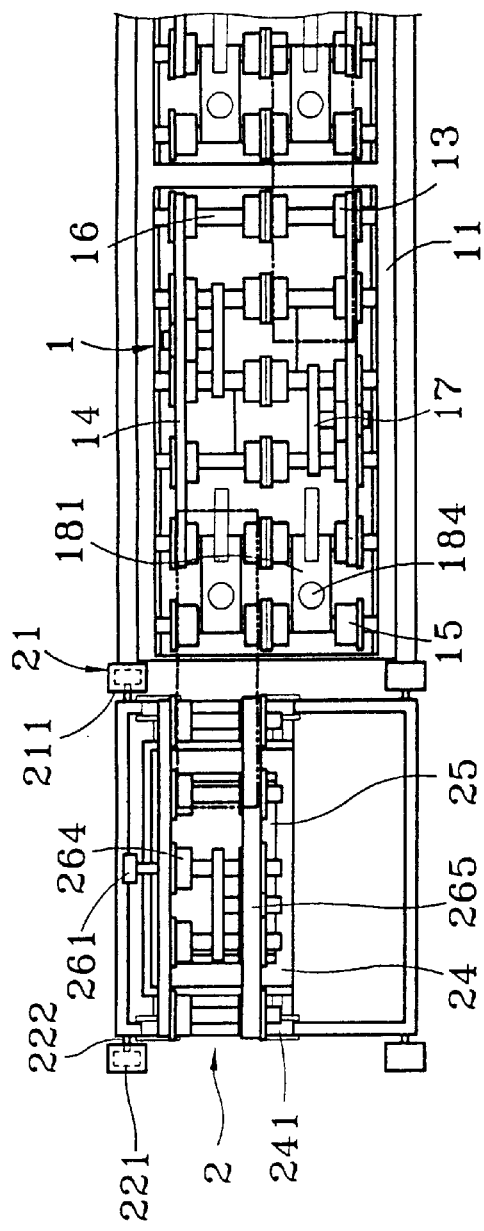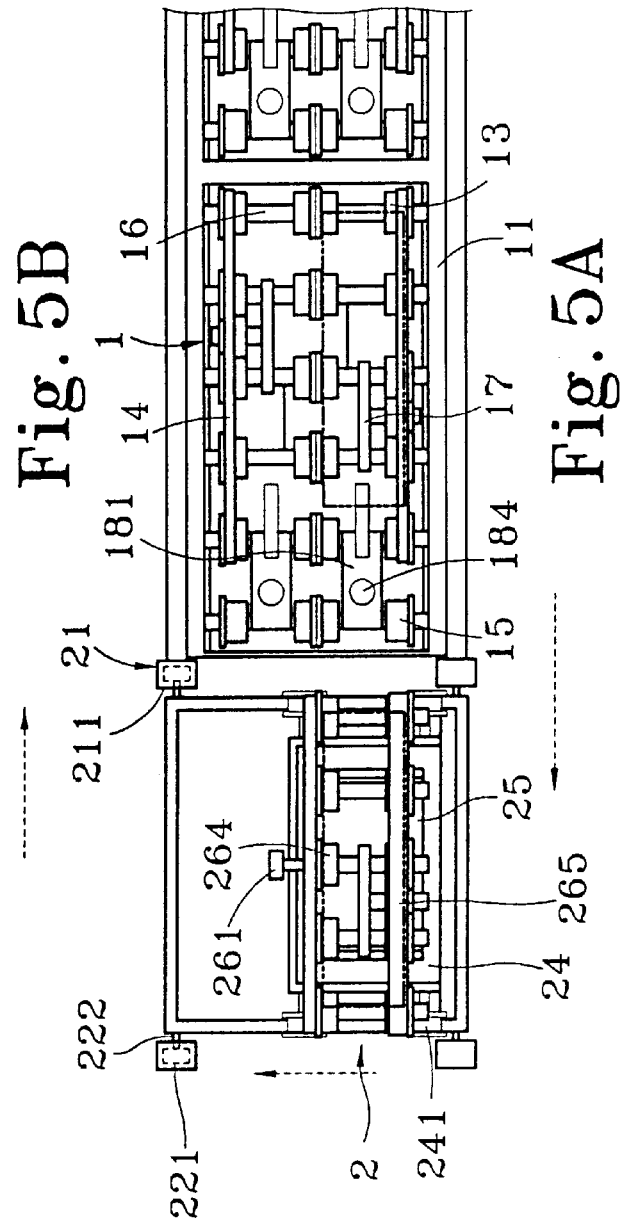

SEMICONDUCTOR COMPOSITION MATERIAL CONVEYER MODULE

BACKGROUND OF THE INVENTION

The present invention relates to a semiconductor composition material conveyer module, and more particularly to such a semiconductor composition material conveyer module which is comprised of horizontal and vertical conveyer units arranged with processing machines into an automatic processing conveying production.

During fabrication of encapsulated semiconductors, press-formed components, etc., materials are delivered from one production line or processing machine to another to receive different processing procedures, for example, wire processing, cutting, or circuit printing. Processed materials tend to be damaged during conveying. In early days, composition materials are delivered from one production line or processing machine to another by workers by means of hand carts or baskets. This method is not economic because it requires much man power, and materials tend to be damaged during delivery. In recent years, various horizontal mechanical conveyers have been developed, and intensively used for conveying semiconductor composition materials. These horizontal mechanical conveyers commonly comprise a base frame, a plurality of rollers mounted on the base frame and arranged in parallel, and a belt transmission mechanism controlled to rotate the rollers. A horizontal mechanical conveyer of this design is to be installed between two processing machines, so that materials processed through a first processing machine can be quickly carried to a second processing machine to receive a secondary processing process. This design of horizontal mechanical conveyer saves much main power. However, a horizontal mechanical conveyer can only be used to deliver composition materials horizontally. For a complicated production line, many horizontal mechanical conveyers may be required. However, much floor space is needed when installing a number of horizontal mechanical conveyers in a factory or plant. In order to save floor space, adapter means may be connected between horizontal mechanical conveyers, or speed changers may be installed, enabling horizontal mechanical conveyers to be arranged into a production line for delivery materials to different processing machines to receive all processing procedures. However, this method is still not satisfactory in function due to the following reasons:

1. Because different production lines are needed for processing different components, the arrangement of conveyers for a production line for one product cannot fit another production line for another product.
2. The factory floor utilization percent according to conventional methods is limited because conventional methods are not aimed at the utilization of three-dimensional space, and additional factory floor space is needed when adding new processing machines.
3. Conventional horizontal mechanical installation methods save little main power, and do not improve yield capacity. During conveying, semiconductor composition material tends to be jammed at a turning corner or before a processing machine, and additional quality control persons must be employed to control material pitch. Conveying material tends to be forced out of place or damaged when jammed.

SUMMARY OF THE INVENTION

The present invention has been accomplished to provide a semiconductor composition material conveyer module which eliminates the aforesaid drawbacks. It is one object of the present invention to provide a semiconductor composition material conveyer module which combines horizontal conveyer units and vertical conveyer units into an automatic production line, enabling semiconductor composition materials to be delivered from one production line or processing machine to another subject to pre-determined course and time schedule, so as to reduce semiconductor fabrication cost and efficiency. It is another object of the present invention to provide a semiconductor composition material conveyer module which enables production lines to be arranged one above another, so as to save much floor space. It is still another object of the present invention to provide a semiconductor composition material conveyer module which allows horizontal conveyer units to be conveniently connected either in series or in parallel, and used with vertical conveyer units to form an automatic production line. It is still another object of the present invention to provide a semiconductor composition material conveyer module which uses sensor means to detect the presence and displacement of semiconductor composition material, enabling semiconductor composition material to be carried from one production line or processing machine to another piece by piece without causing a jam. To achieve these and other objects of the present invention, there is provided a semiconductor composition material conveyer module which is comprised of a plurality of horizontal conveyer units and at least one vertical conveyer unit. Each vertical conveyer unit comprises a rack having two vertical sliding tracks, a carriage moved vertically between the sliding tracks at the rack, a slide moved back and forth at the carriage, a steering mechanism mounted on the slide and controlled to turn the direction of semiconductor composition material carried on the vertical conveyer unit.

BRIEF DESCRIPTION OF THE DRAWINGS

FIGS. 3C and 3D are schematic drawings, showing the displacement of the vertical conveyer unit according to the present invention.

FIGS. 5A and 5B show another application example of the present invention.

DETAILED DESCRIPTION OF THE PREFERRED EMBODIMENT

Figure 1:
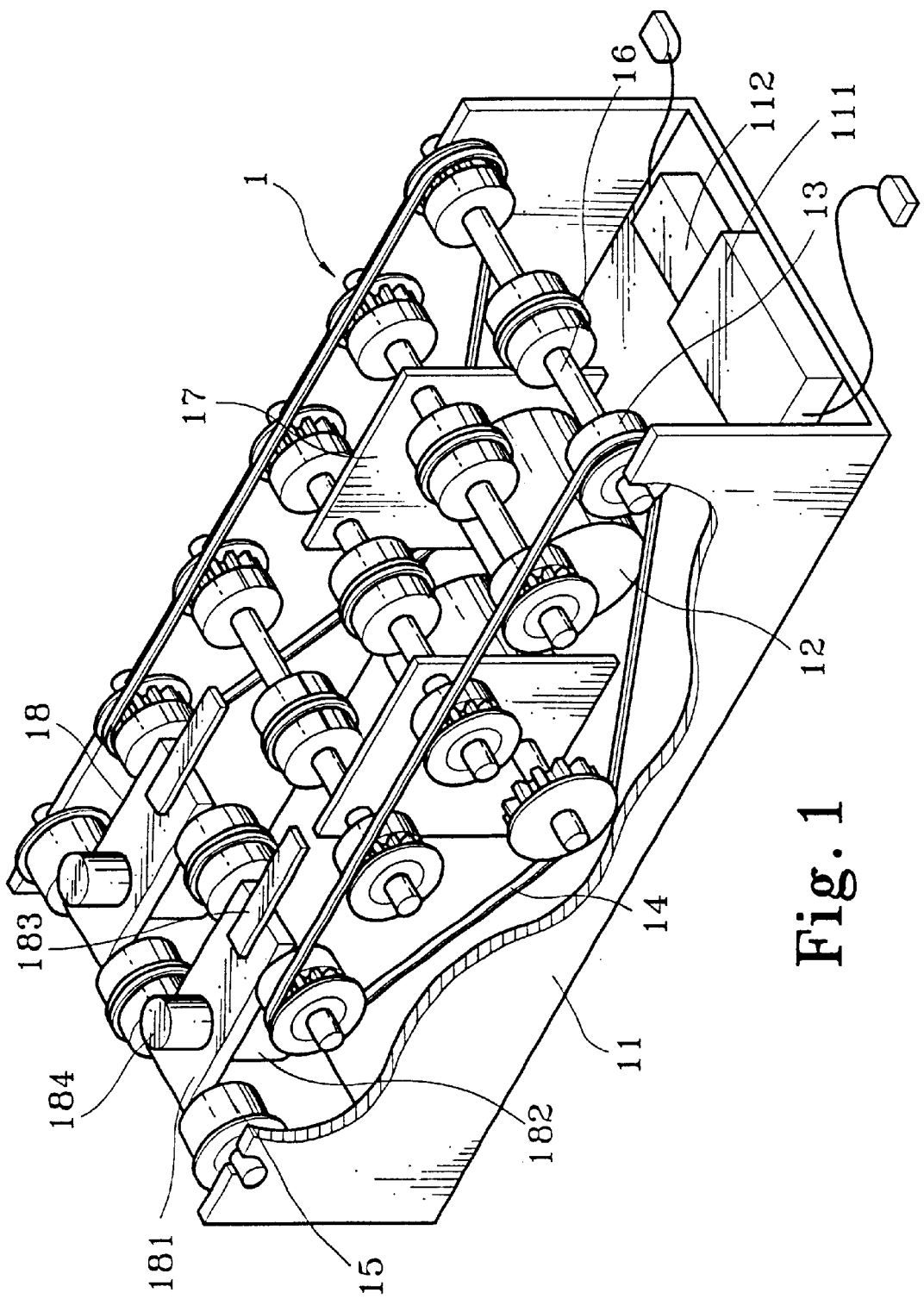
FIG. 1 is a perspective view of a horizontal conveyer unit according to the present invention.
Figure 2:
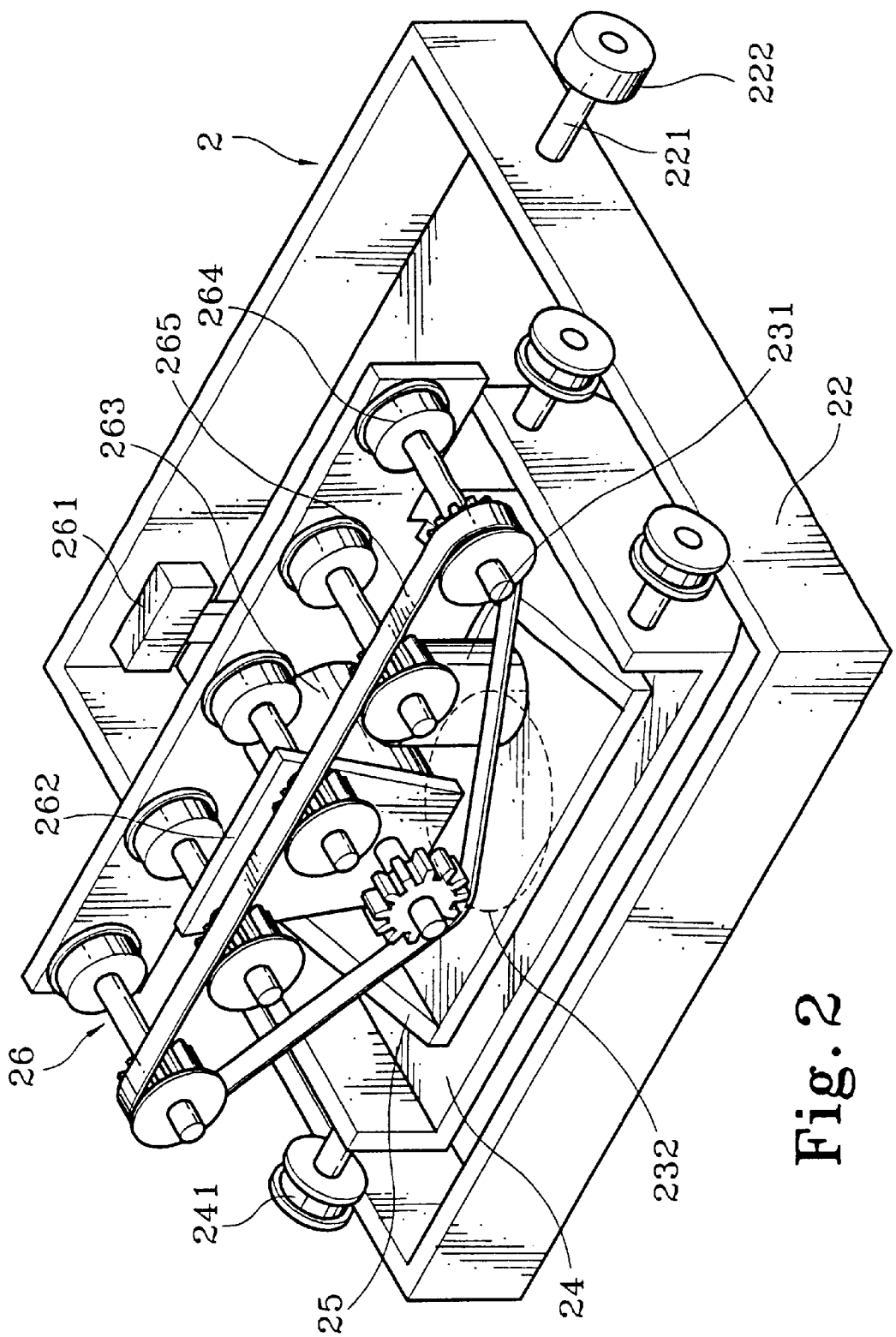
FIG. 2 is a perspective view of a vertical conveyer unit according to the present invention.
Figure 3A:
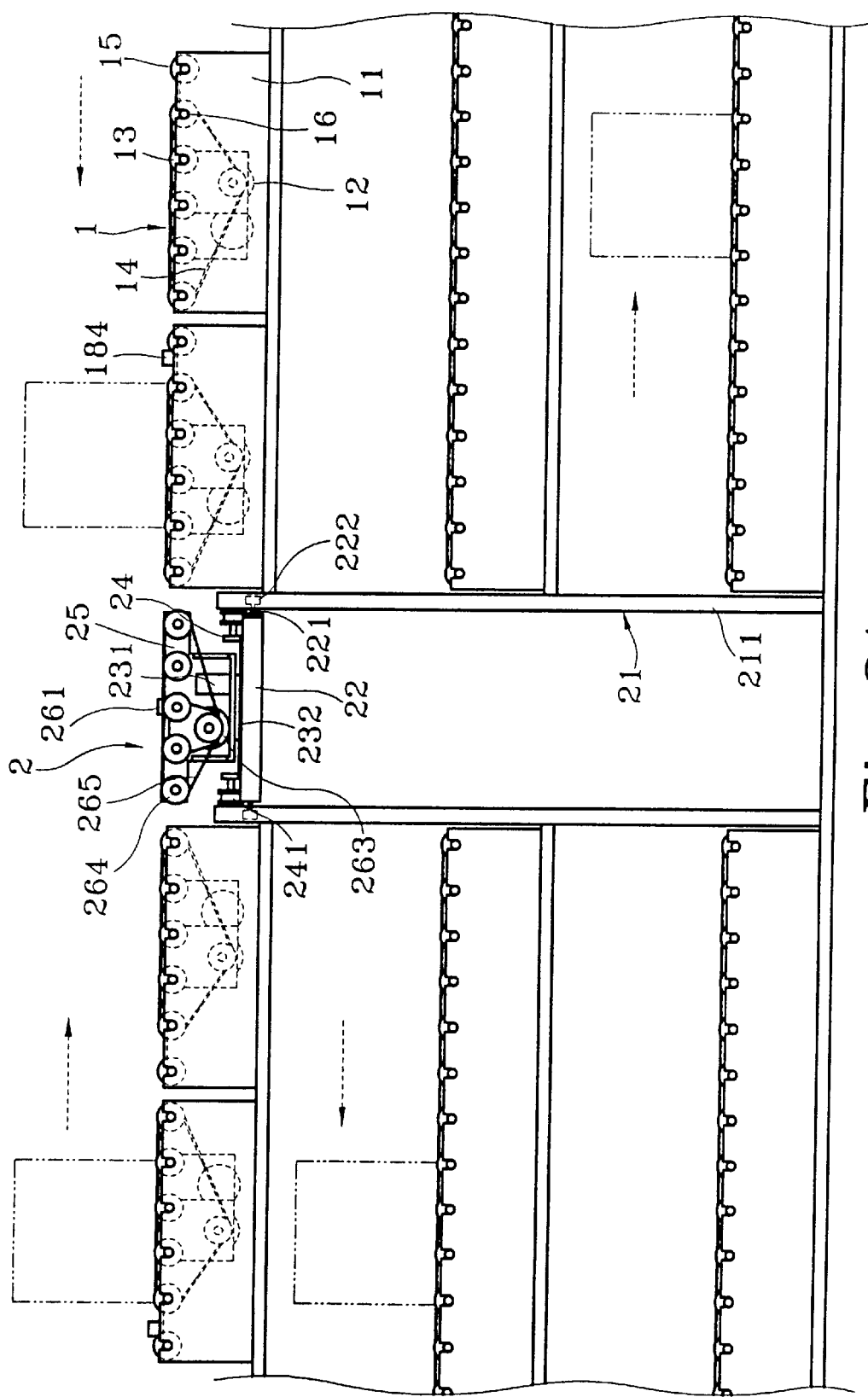
FIG. 3A is a schematic drawing showing conveying of semiconductor composition material from one horizontal conveyer unit to another through a vertical conveyer unit.

Referring to FIGS. 1, 2 and 3A, the invention comprises at least one horizontal conveyer unit 1 connected in series or parallel, forming one or multiple processing conveying production lines, and at least one vertical conveyer unit 2 respectively connected to the front end or rear end of each processing conveying production line for conveying material from one conveying production line to another.

Each of the horizontal conveyer units 1 (see FIG. 1) comprises a casing 11, an electric motor 12, which can be a step motor, DC motor or AC motor, securely mounted in the casing 11, electric power and signal connectors 111,112 for transmission of electric power and signal between the horizontal conveyer units 1, a plurality of axles 16 fixedly connected between two parallel side walls of the casing 11, multiple roller sets 13 respectively supported on respective axle bearings at the axles 16 and rotated by the motor 12 through transmission belts 14, a plurality of auxiliary wheels 15 respectively supported on respective axle bearings at the axles 16 and coupled to the roller sets 13 at one side, a plurality of support boards 17 respectively mounted in the casing 11 to support the axles 16, and a plurality of sensors for example electromagnetic switches 18 mounted on the casing 11 and arranged in parallel. Each of the electromagnetic switches 18 comprises a mount 181 securely mounted on the axles 16, a magnetic controller 182 mounted on the mount 181, and an induction plate 183 fixedly mounted on one end of the mount 181. The magnetic controller 182 is controlled by the induction plate 183 to move a metal stop rod 184 thereof between two positions. When the induction plate 183 is induced to output a signal to the magnetic controller 182, the metal stop rod 184 is extended out to stop material from passing forward. On the contrary, when the magnetic controller 182 receives no signal from the induction plate 183, the metal stop rod 184 is received, enabling material to be delivered forwards.

Each of the vertical conveyer units 2 (see FIG. 2) comprises a carriage 22 moved vertically between vertical sliding tracks 211 at a rack 21, a slide 24 moved back and forth at the carriage 22, a steering mechanism 23 carried on the slide 24, and a transfer mechanism 26 mounted in the steering mechanism 23. The carriage 22 comprises two fixed axles 221 at two opposite sides, and two rollers 222 respectively mounted on the fixed axles 221 and moved with the carriage 22 along the vertical sliding tracks 211 at the rack 21. The slide 24 comprises symmetrical pairs of rollers 241 respectively disposed at two opposite sides and moved with the slide 24 along two opposite vertical side walls of the carriage 22. The steering mechanism 23 comprises a rotary table 232 mounted inside the slide 24, a holder frame 25 securely mounted on the rotary table 232, and a motor 231 controlled to rotate the rotary table 232. The transfer mechanism 26 comprises an upright support plate 262 mounted in the holder frame 25, a motor 263 securely mounted on the support plate 262, a plurality of roller sets 264 mounted in the holder frame 25, a transmission belt 265 coupled between the roller sets 264 and the motor 263, and a displacement sensor 261 mounted in the holder frame 25 to detect delivery of semiconductor composition material. Upon detection of delivery of semiconductor composition material, the displacement sensor 261 outputs a signal to the motor 263, causing the transfer mechanism 26 to receive semiconductor composition material, and then the motor 231 is driven to rotate the rotary table 232 and the holder frame 25, enabling semiconductor composition material to be transferred to a processing machine, or a next processing line or conveying line for further manufacturing process. Each of the vertical conveyer units 2 further comprise a first transmission mechanism (not shown) controlled to move the slide 24 back and forth at the carriage 22, and a second transmission mechanism (not shown) controlled to move the carriage 22 vertically between the vertical sliding tracks 211 at the rack 21.

The aforesaid horizontal conveyer units 1 and vertical conveyer units 2 form an automatic production line for automatically conveying semiconductor composition material to a processing machine, or a next processing line for further manufacturing process. This design is economic, and achieves high performance.

Referring to FIGS. 1 and 3A again, when semiconductor composition material is put on or delivered to the roller sets 13 at one horizontal conveyer unit 1, the motor 12 of the respective horizontal conveyer unit 1 is controlled to turn the respective transmission belt 14, causing the respective roller sets 13 to carry semiconductor composition material from one end of the respective casing 11, enabling semiconductor composition material to be further carried to a next horizontal conveyer unit 1. When one piece of semiconductor composition material passed over the induction plate 183 of each of the electromagnetic switches 18 at one horizontal conveyer unit 1, the induction plate 183 immediately outputs a signal to the respective magnetic controller 182, causing the respective metal stop rod 184 to be extended out to stop a next piece of semiconductor composition material from passing forwards, so as to prevent a jam of semiconductor composition material at each horizontal conveyer unit 1.

Figure 3B:
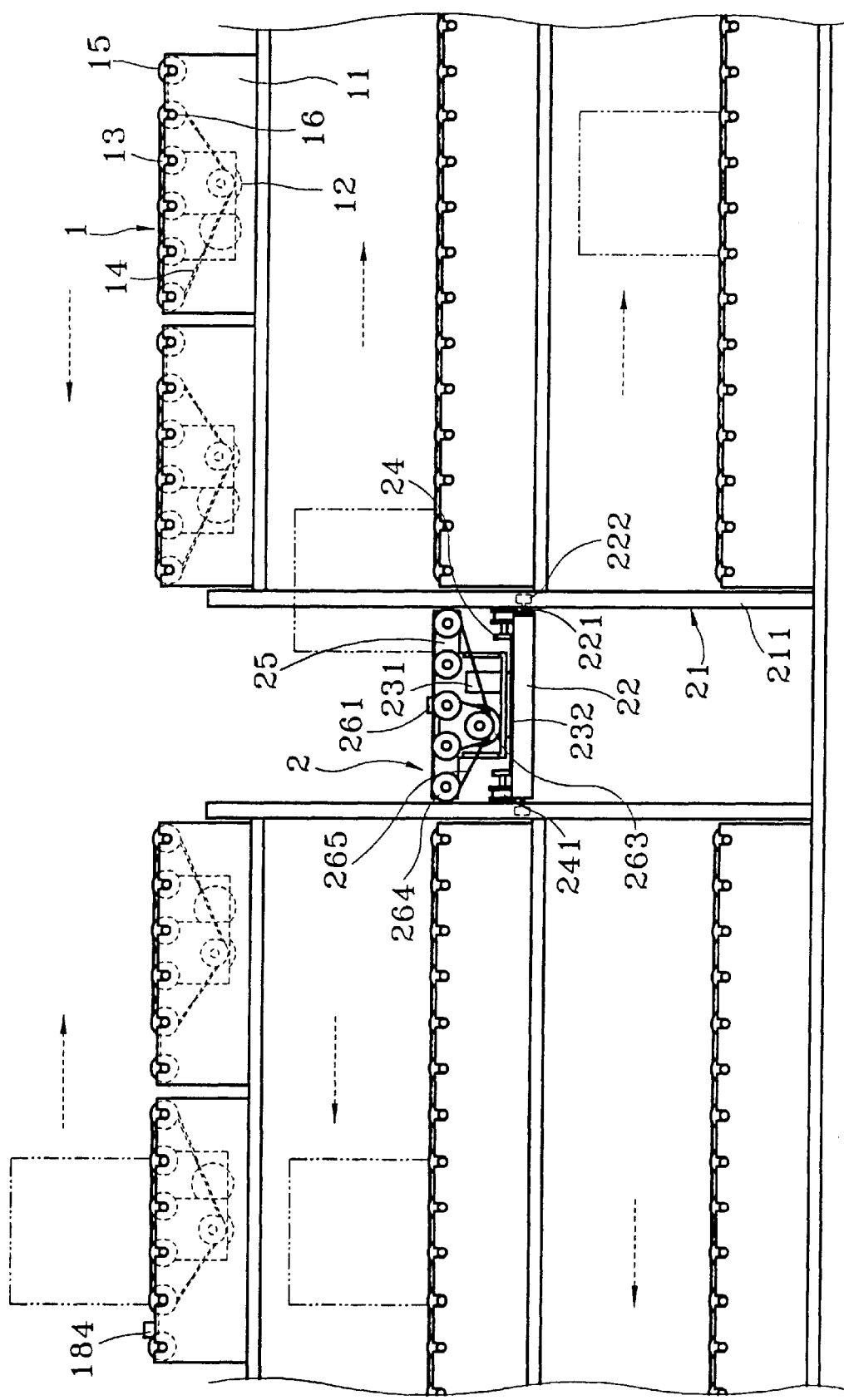
FIG. 3B is similar to FIG. 3A but showing the vertical conveyer unit lowered to a next production line.
Figure 3E:
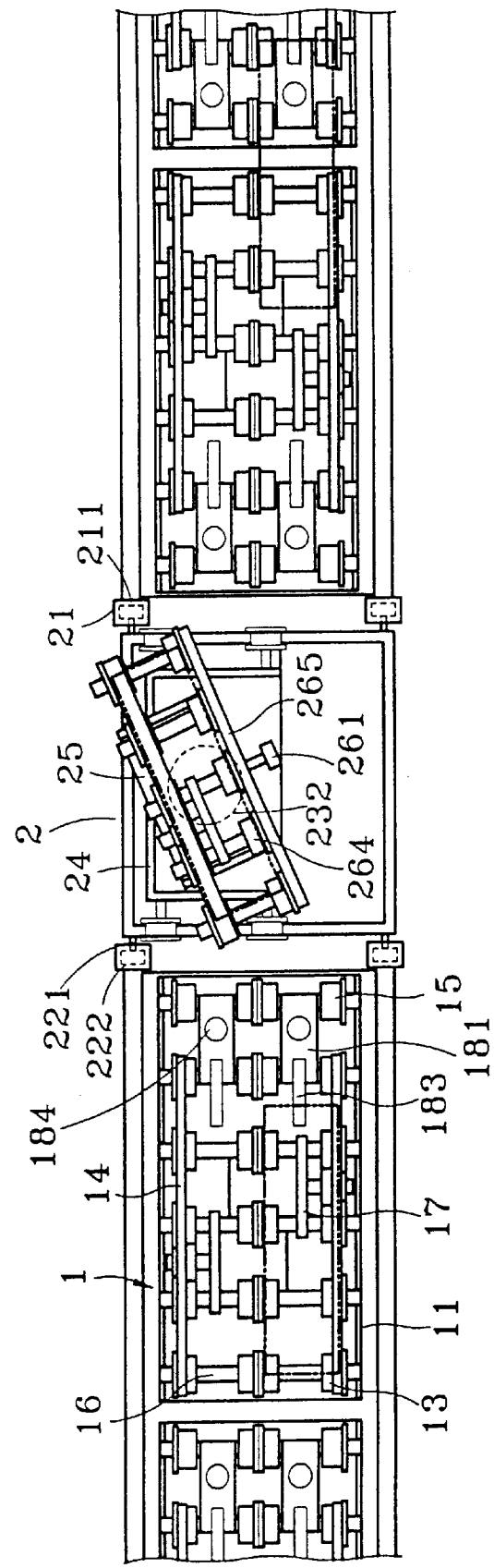
FIG. 3E is a schematic drawing showing the angular position of the steering mechanism of the vertical conveyer unit changed.

Referring to FIG. 3B and FIGS. 2 and 3A again, when semiconductor composition material is delivered from one horizontal conveyer unit 1 to the transfer mechanism 26 at one vertical conveyer unit 2, the respective displacement sensor 261 detects the presence of semiconductor composition material, and outputs a signal to the respective vertical conveyer unit 2. When the vertical conveyer unit 2 receives a signal from the displacement sensor 261, the respective carriage 22 is driven by the respective second transmission mechanism and moved between the vertical sliding tracks 211 to the set height. When reached the set height, see FIGS. 3C and 3D, an elevation sensor (not shown) is induced to output a first signal to the respective second transmission mechanism, causing it to stop the carriage 22, and a second signal to the respective first transmission mechanism, causing it to move the slide 24 at the carriage 22 from one side to the other. At this time, as shown in FIG. 3E, the position sensor (not shown) at the respective vertical conveyer unit 2 is induced to output a first signal to the respective first transmission mechanism, causing it to stop the slide 24, and a second signal to the motor 231 of the respective steering mechanism 23, causing the motor 231 to turn the respective rotary table 232 and holder frame 25 to the direction toward the next processing line or processing machine. When reached the set direction, a respective sensor (not shown) is induced to output a first signal to the motor 231, causing it to stop the respective rotary table 232 and holder frame 25 at the set angular position, and a second signal to the motor 263 of the transfer mechanism 26, causing it to turn the respective transmission belt 265 and roller sets 264, enabling semiconductor composition material to be delivered to a next processing line or processing machine for further processing. By means of the displacement sensor 261 to detect displacement of semiconductor composition material, the vertical conveyer unit 2 is kept in position, or returned to its former position for a next semiconductor composition material conveying operation.

Figure 4:
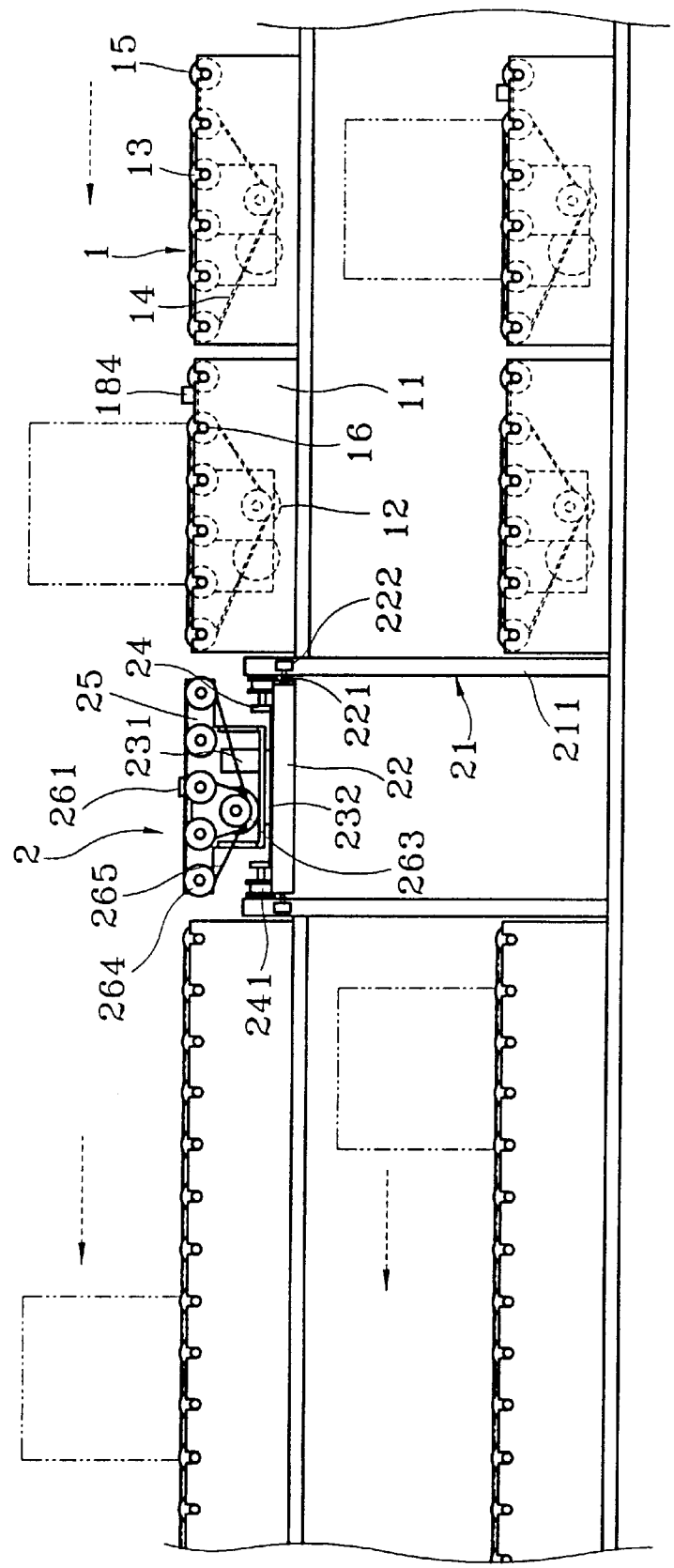
FIG. 4 shows an application example of the present invention.

Referring to FIG. 4, the horizontal conveyer units 1 can be connected in series or parallel subject to requirement of the semiconductor composition material conveying and processing operation, to form one or multiple conveying lines. Different processing machines may be installed in each conveying line at both ends or on the middle. The vertical conveyer units 2 can be arranged in a stack, forming a production line. The vertical conveyer units 2 are arranged to match with the horizontal conveyer units 1. The vertical conveyer units 2 can be set at either end of each production line of the horizontal conveyer units 1, or between two horizontal conveyer units 1. The horizontal production lines of the horizontal conveyer units 1 and the vertical production lines of the vertical conveyer units 2 are linked, forming a fully automatic production line.

When semiconductor composition material is delivered from one horizontal conveyer unit 1 to a first processing machine, it is processed by the first processing machine, and then delivered by the first processing machine back to the transfer mechanism 26 of the respective horizontal conveyer unit 1 or another horizontal conveyer unit 1 subject to the processing production line desired. The arrangement of the related parts, processing machines can be adjusted subject to individual processing requirement.

Referring to FIGS. 5A and 5B, the horizontal conveyer units 1 are connected in parallel, forming a bi-direction semiconductor composition material conveying system, and vertical conveyer units 2 are installed to match with the bi-direction semiconductor composition material conveying system. When semiconductor composition material is inputted into the horizontal conveyer unit 1 at one side for processing, well processed composition material is delivered to an output point by the horizontal conveyer unit 1 at the other side.

Further, each horizontal unit 1 can be directly mounted on the matched processing machine to save installation space. This arrangement enables each horizontal unit 1 to be conveniently moved with the matched processing machine to the desired location in the plant.

It is to be understood that the drawings are designed for purposes of illustration only, and are not intended as a definition of the limits and scope of the invention disclosed.

What is claimed is:

1. A semiconductor composition material conveyer module comprising:

at least one horizontal conveyer unit arranged into at least one processing conveying production line, said at least one horizontal conveyer unit each comprising a casing, a motor mounted inside said casing, and a plurality of roller sets mounted in said casing and driven by said motor to convey semiconductor composition material; and at least one vertical conveyer unit respectively arranged at one end of said at least one processing conveying production line for conveying semiconductor composition material from one of said at least one processing conveying production line to another processing conveying production line;

wherein each of said at least one horizontal conveyer unit further comprises sensor means to control pitch between pieces of semiconductor composition materials being delivered; and wherein said sensor means is an electromagnetic switch comprising a fixed mount, an induction plate fixedly mounted on one end of said fixed mount to detect the presence of semiconductor composition material, and a magnetic controller mounted on said fixed mount and controlled by said induction plate to move a metal stop rod thereof between a first position to stop semiconductor composition material from passing forward, and a second position to let semiconductor composition material to be carried forwards.

2. The semiconductor composition material conveyer module of claim 1 wherein said at least one horizontal conveyer unit each further comprising a power connector and a signal connector mounted in the respective casing.

3. The semiconductor composition material conveyer module of claim 1 wherein the motor of each of said horizontal conveyer unit is a step motor.

4. The semiconductor composition material conveyer module of claim 1 wherein the motor of each of said horizontal conveyer unit is a DC motor.

5. The semiconductor composition material conveyer module of claim 1 wherein the motor of each of said horizontal conveyer unit is an AC motor.

6. The semiconductor composition material conveyer module of claim 1 wherein each of said at least one horizontal conveyer unit further comprises a plurality of fixed axles, and a plurality of axle bearings mounted on said axles to support the respective roller sets.

7. The semiconductor composition material conveyer module of claim 6 wherein said axles are supported on upright support boards in the casing of the respective horizontal conveyer unit.

8. The semiconductor composition material conveyer module of claim 1 wherein each of said at least one horizontal conveyer unit further comprises a plurality of auxiliary wheels respectively coupled to said roller sets at one side for conveying semiconductor composition material.

* * * * *